US012759186B2

(12) United States Patent
Zhu et al.

(10) Patent No.: US 12,759,186 B2
(45) Date of Patent: Oct. 13, 2026

(54) ENERGY STORAGE MECHANISM AND NAIL GUN HAVING SAME

(71) Applicant: TAIZHOU DAJIANG IND. CO. LTD., Wenling (CN)

(72) Inventors: Zaijun Zhu, Wenling (CN); Mingjun Yang, Wenling (CN); Yunzai Zhang, Wenling (CN); Hongfeng Zhou, Wenling (CN); Tao Yang, Wenling (CN); Haijun Li, Wenling (CN)

(73) Assignee: TAIZHOU DAJIANG IND. CO. LTD., Wenling (CN)

( * ) Notice: Subject to any disclaimer, the term of this patent is extended or adjusted under 35 U.S.C. 154(b) by 81 days.

(21) Appl. No.: 18/813,821

(22) Filed: Aug. 23, 2024

(65) Prior Publication Data

US 2024/0416547 A1 Dec. 19, 2024

Related U.S. Application Data

(63) Continuation of application No. PCT/CN2022/101896, filed on Jun. 28, 2022.

(30) Foreign Application Priority Data

Feb. 25, 2022 (CN) ......................... 202210178702.3

(51) Int. Cl.
*B27F 7/09* (2006.01)

(52) U.S. Cl.
CPC ..................................... *B27F 7/09* (2013.01)

(58) Field of Classification Search
CPC ......................................................... B27F 7/09
(Continued)

(56) References Cited

U.S. PATENT DOCUMENTS 3,589,588 A * 6/1971 Vasku ........................ B25C 1/06 227/132
7,677,426 B2 * 3/2010 Tillinghast .............. B25C 1/043 227/123

(Continued)

FOREIGN PATENT DOCUMENTS

CN 109070320 A 12/2018
CN 113084757 A 7/2021

(Continued)

OTHER PUBLICATIONS

International Search Report issued by the China National Intellectual Property Administration for Application No. PCT/CN2022/101896, China, Nov. 30, 2022.

*Primary Examiner* — Nathaniel C Chukwurah
(74) *Attorney, Agent, or Firm* — Tim Tingkang Xia, Esq.; Troutman Pepper Locke LLP

(57) ABSTRACT

An energy storage mechanism and a nail gun having the same. The energy storage mechanism is coupled with a striking mechanism for striking nails out of the nail gun along a striking direction. The energy storage mechanism comprises an energy storage member comprising an air chamber for containing air; an inner cylinder body for installing the striking mechanism therein; and an outer cylinder arranged outside the inner cylinder, such that the air chamber is formed between the outer cylinder and the inner cylinder; an inflatable member disposed on the energy storage member and configured to inflate the air chamber; and a pressure relief member disposed on the energy storage member and configured to release the pressure in the air chamber.

19 Claims, 9 Drawing Sheets

(58) Field of Classification Search
USPC .......................................... 150/130; 227/130
See application file for complete search history.

(56) References Cited

U.S. PATENT DOCUMENTS

| | | | | |
|---|---|---|---|---|
| 8,091,751 | B2* | 1/2012 | Tanaka | B25C 1/008 227/156 |
| 8,746,527 | B2* | 6/2014 | Laubach | B25C 1/044 227/8 |
| 11,951,601 | B2* | 4/2024 | Cholst | B25C 1/041 |
| 12,048,992 | B2* | 7/2024 | Bierdeman | B25C 1/06 |
| 2005/0001007 | A1* | 1/2005 | Butzen | B25C 1/047 227/130 |
| 2008/0006670 | A1* | 1/2008 | Wen | B25C 1/045 227/130 |
| 2008/0190986 | A1* | 8/2008 | Chang | B25C 1/06 227/107 |
| 2010/0230463 | A1* | 9/2010 | Yang | B25C 5/1651 227/127 |
| 2011/0057014 | A1* | 3/2011 | Yang | B25C 1/008 227/8 |
| 2011/0114692 | A1* | 5/2011 | Liang | B25C 1/04 227/156 |
| 2011/0114695 | A1* | 5/2011 | Yang | B25C 1/005 227/109 |
| 2011/0180581 | A1* | 7/2011 | Liang | B25C 1/047 227/8 |
| 2011/0198384 | A1* | 8/2011 | Kitagawa | B25C 1/008 227/130 |
| 2011/0290850 | A1* | 12/2011 | Wu | B25C 1/04 227/130 |
| 2015/0197001 | A1* | 7/2015 | Li | B25C 1/047 227/130 |
| 2016/0288305 | A1* | 10/2016 | McCardle | B25C 1/06 |
| 2018/0154505 | A1* | 6/2018 | Sato | B25C 1/047 |
| 2018/0290279 | A1* | 10/2018 | Kobori | B25C 1/06 |
| 2021/0370487 | A1* | 12/2021 | Weber | B25C 1/042 |
| 2022/0009067 | A1* | 1/2022 | Knight | B25C 1/06 |
| 2023/0090859 | A1* | 3/2023 | Yasutomi | B25C 1/047 227/8 |
| 2023/0202010 | A1* | 6/2023 | Wu | B25C 1/047 227/130 |

FOREIGN PATENT DOCUMENTS

| | | | |
|---|---|---|---|
| CN | 113977527 | A | 1/2022 |
| EP | 3578315 | A1 | 12/2019 |
| JP | 2013215840 | A | 10/2013 |
| JP | 2013230514 | A | 11/2013 |

* cited by examiner

ENERGY STORAGE MECHANISM AND NAIL GUN HAVING SAME

CROSS-REFERENCE TO RELATED PATENT APPLICATIONS

This application is a continuation application of International Patent Application No. PCT/CN2022/101896, filed Jun. 28, 2022, which itself claims priority to Chinese Patent Application No. 202210178702.3, filed Feb. 25, 2022, which are hereby incorporated herein in their entireties by reference.

FIELD OF THE INVENTION

This invention relates generally to nail guns, and more particularly to an energy storage mechanism and a nail gun having the same.

BACKGROUND OF THE INVENTION

The background description provided herein is for the purpose of generally presenting the context of the invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

A nail gun is a fastening tool that is mostly used in construction. According to the power provided by different power sources, nail guns are categorized into lithium-ion nail guns and pneumatic nail guns. Lithium-ion nail guns are powered by lithium batteries, and the control system drives the motor and the corresponding transmission structure to push the piston, which then compresses the force supply spring to store energy. When shooting nails, the force supply spring drives the piston to move, which in turn drives the firing pin installed on the piston to strike and shoot the nail to achieve nailing. A pneumatic nail gun is, as described in Chinese Patent No. CN214560685U, a cylinder is arranged inside the nail gun housing, and a piston is arranged in the cylinder. The piston divides the inner chamber of the cylinder into an air inlet chamber and an air outlet chamber. The air inlet chamber needs to be equipped with a separate air compressor for air supply. The air compressor is used to fill the air inlet chamber with high-pressure air to drive the piston to move, which in turn drives the firing pin installed on the piston to strike and shoot the nail to achieve nailing. The above-mentioned nail gun that uses springs to store energy and drive nailing has certain limitations due to the spring elastic force. Therefore, it is not very suitable when the hardness of some objects to be nailed is relatively large. The above-mentioned pneumatic nail guns are not convenient to carry in actual use because they require a separate air compressor to provide air.

In order to solve the defects of the above-mentioned pneumatic nail guns, some methods that combine motors and air to drive the nail guns have gradually appeared on the market. A separate air chamber is set inside this nail gun. The air chamber is filled with a certain amount of air in advance, and a piston and a striker are set in the air chamber. The motor drives the striker to drive the piston to move inside the air chamber, and then the piston compresses the air inside the air chamber to store energy. When nailing, the compressed air drives the piston to move, and then drives the firing pin installed on the piston to hit the gun nail to shoot out to achieve nailing. However, nail guns on the market still have certain problems. For example, if the air in the air chamber leaks during long-term use, users need to return the gun to the factory for repair and re-inflation, which is not convenient. In addition, it is not easy for users to control the changes in the air pressure in the air chamber during use. If the air pressure in the air chamber is too high for some reason, the cylinder will be easily damaged during operation, affecting the service life of the nail gun and even endangering the user's personal safety.

Therefore, a heretofore unaddressed need exists in the art to address the aforementioned deficiencies and inadequacies.

SUMMARY OF THE INVENTION

One of the objectives of this invention is to provide an energy storage mechanism with a simpler structure and stronger safety and a nail gun having the same to solve the above problems.

In one aspect of the invention, the energy storage mechanism is used for a nail gun for nailing, which is coupled with a striking mechanism for striking nails out of the nail gun along a striking direction. The energy storage mechanism comprises an energy storage member comprising an air chamber for containing air; an inner cylinder body for installing the striking mechanism therein; and an outer cylinder arranged outside the inner cylinder, such that the air chamber is formed between the outer cylinder and the inner cylinder; an inflatable member disposed on the energy storage member and configured to inflate the air chamber; and a pressure relief member disposed on the energy storage member and configured to release the pressure in the air chamber.

In one embodiment, the outer cylinder comprises an outer cylinder body; a rear cover detachably attached onto the rear end of the outer cylinder body to cover the outer cylinder body; and a first sealing member placed at the connection between the rear cover and the outer cylinder body for forming a sealed state between the rear cover body and the outer cylinder body.

In one embodiment, the outer cylinder body comprises an air inlet formed the rear end of the outer cylinder body in fluidic communication with the inflatable member; and an air inlet passage connecting the air inlet and the air chamber.

In one embodiment, the inflatable member comprises an inflatable nozzle with an inflatable channel in the middle, having one end inserted into the air inlet, and the other end extended out of the outer cylinder body and exposed on an outside environment.

In one embodiment, the outer cylinder body comprises a pressure relief port formed the front end of the outer cylinder body; and a pressure relief channel connecting the pressure relief port and the air chamber.

In one embodiment, the pressure relief member is disposed on the front end of the outer cylinder body in fluidic communication with the air chamber, and comprises a pressure relief valve configured such that when the pressure in the air chamber reaches a preset threshold value, the pressure relief valve is automatically opened to release the pressure in the air chamber to keep the air pressure in the air chamber within the threshold value, or when the outer cylinder body needs to be maintained, the pressure relief valve is manually opened to discharge the air inside the air chamber before disassembly.

In one embodiment, the pressure relief valve comprises a pressure relief valve body; a pressure relief valve core; and a pressure relief spring; wherein one end of the pressure relief valve body is fixedly installed in the pressure relief port, and the other end of the pressure relief valve body extends out and is exposed outside the outer cylinder body; wherein a middle portion of the pressure relief valve body is provided with a pressure relief chamber fluidically communicating with the pressure relief port, and the side of the pressure relief valve body is provided with a pressure relief hole communicating with the pressure relief chamber and the outside environment; and wherein the pressure relief valve core is disposed in the pressure relief chamber and is moveable therein by the pressure relief spring.

In one embodiment, the side wall of the pressure relief chamber is formed with a limiting and blocking surface that operably engages with the pressure relief valve core, such that when the pressure relief valve core is in tight contact with the limiting and blocking surface under the action of the pressure relief spring, the pressure relief valve is closed, and the air in the air chamber cannot be discharged; when air pressure in the air chamber increases and exceeds a preset threshold value, air from the air chamber enters into the pressure relief chamber through the pressure relief channel and the pressure relief port and pushes the pressure relief valve core away from the limiting and blocking surface to form a gap therebetween, the air then passes through the gap and is discharged from the pressure relief hole, thereby releasing the pressure inside the air chamber, and wherein when the air pressure in the air chamber drops to the preset threshold value, under the action of the pressure relief spring, the pressure relief valve core is pushed back to make it in tight contact with the limiting and blocking surface.

In one embodiment, the energy storage mechanism further comprises a buffer pad disposed at the front end of the inner cylinder and configured to provide blocking and buffering for the striking mechanism, wherein the middle portion of the buffer pad is provided with a through hole through which the front end of the striker mechanism is extended.

In one embodiment, the outer circumference of the buffer pad is provided with a mounting convex ring; the inner side of the front end of the outer cylinder body is provided with a limiting surface and a limiting boss; the front end of the buffer pad abuts against the limiting surface; and the front end surface of the inner cylinder abuts against the mounting convex ring and the limiting boss, thereby realizing the connections between the buffer pad, the inner cylinder and the outer cylinder body.

In one embodiment, the interior of the inner cylinder is divided into a first cavity and a second cavity with variable volumes, the first cavity is in fluidic communication with the outside environment and the second cavity is in fluidic communication with the air chamber.

In one embodiment, the inner cylinder body is provided with an inner through hole at one end close to the buffer pad for connecting the first cavity with the outside environment.

In one embodiment, the energy storage mechanism further comprises a third sealing member disposed between the outer circumference of the front end of the inner cylinder and the inner wall of the outer cylinder body; wherein the front end of the outer cylinder body is provided with an outer through hole aligned with and in fluidic communication with the inner through hole of the inner cylinder, thereby connecting the first cavity with the outside environment; and wherein the air chamber and the outer through hole are respectively located two sides of the third sealing member.

In one embodiment, the energy storage mechanism further comprises a protruding ring arranged at the outer circumference of the inner cylinder distal to the third sealing member, and a circular positioning flange disposed on the outer circumference of the inner cylinder between the protruding ring and the rear cover, and having at least one air hole defined on the circular positioning flange for air passing through, wherein the inner circumference of the circular positioning flange is sleeved on the outer circumference of the inner cylinder, and the outer circumference of the circular positioning flange is blocked by the end surface of the rear cover facing the outer cylinder body, so that the circular positioning flange is limited between the rear cover and the protruding ring. The third sealing member and the circular positioning flange are respectively disposed at the front and rear ends of the inner cylinder to support the front and rear ends of the inner cylinder.

In one embodiment, the front end of the inner cylinder is fixed to the outer cylinder body, and the rear end of the inner cylinder is fixed to the outer cylinder body through the circular positioning flange.

In one embodiment, the outer cylinder body further comprises a mounting portion formed at the front end of the outer cylinder body for mounting the transmission mechanism. The mounting portion includes a recess formed for mounting a transmission member that operably drives the striking mechanism to move in an opposite direction to the striking direction, and a mounting groove formed for accommodating the limiting member that operably limits the striking mechanism to move in the striking direction.

In one embodiment, the recess has a hole on one side wall facing the groove for partially passing the limiting member.

In another aspect of the invention, the nail gun for nailing comprises the energy storage mechanism as disclosed above. The energy storage mechanism is configured to provide energy to drive the striking mechanism to move in the striking direction, and store energy when the striking mechanism is driven to move in an opposite direction to the striking direction.

In one embodiment, the nail gun further comprises a transmission mechanism coupled with the energy storage mechanism and the striking mechanism for driving the striking mechanism to move in the opposite direction to the striking direction for storing energy.

According to the energy storage mechanism and the nail gun for nailing of the invention, since the air chamber adapted for accommodating stored air is provided in the energy storage member, the energy storage mechanism itself has an air storage function, and there is no need to connect a compressor to provide gas during the operation of the nail gun, thereby simplifying the structure and making it more convenient to carry and use. In addition, since the inflatable member and the pressure relief member are provided on the energy storage member, when the air pressure inside the air chamber is insufficient, the user only needs to connect the inflatable member with a special inflation device to inflate the inside of the air chamber, which is very convenient. When the air pressure inside the air chamber is too high, the pressure relief member can relieve the pressure inside the air chamber, so that the air inside the air chamber can always be maintained in a state that not only can drive out nails, but also can maintain a safe and stable state.

These and other aspects of the invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
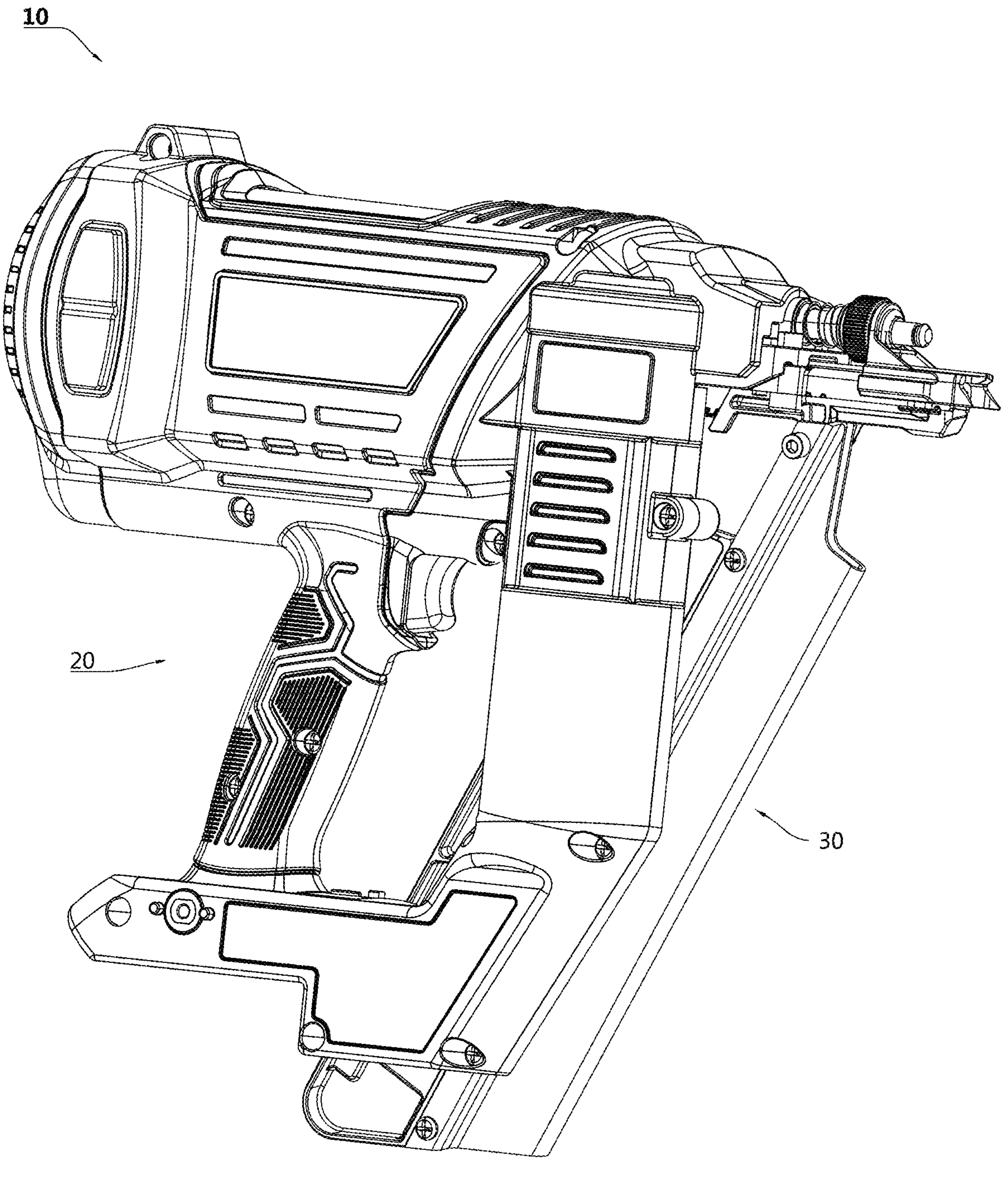
FIG. 1 shows schematically a perspective view of a nail gun according to one embodiment of the invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are configured to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only configured to distinguish one element, component, region, layer or section from another element, component, region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about" "substantially" or "approximately" can be inferred if not expressly stated.

As used in this specification, the phrase "at least one of A, B, and C" should be construed to mean a logical (A or B or C), using a non-exclusive logical OR. As used herein, the term "and/or" includes any and all combinations of one or more of the associated listed items.

Embodiments of the invention are illustrated in detail hereinafter with reference to accompanying drawings. The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

In accordance with the purposes of this invention, as embodied and broadly described herein, this invention, in certain aspects, relates to an energy storage mechanism and a nail gun with the energy storage mechanism.

In one aspect of the invention, the energy storage mechanism is used for a nail gun for nailing, which is coupled with a striking mechanism for striking nails out of the nail gun along a striking direction. The energy storage mechanism comprises an energy storage member comprising an air chamber for containing air; an inner cylinder body for installing the striking mechanism therein; and an outer cylinder arranged outside the inner cylinder, such that the air chamber is formed between the outer cylinder and the inner cylinder; an inflatable member disposed on the energy storage member and configured to inflate the air chamber; and a pressure relief member disposed on the energy storage member and configured to release the pressure in the air chamber.

In one embodiment, the outer cylinder comprises an outer cylinder body; a rear cover detachably attached onto the rear end of the outer cylinder body to cover the outer cylinder body; and a first sealing member placed at the connection between the rear cover and the outer cylinder body for forming a sealed state between the rear cover body and the outer cylinder body.

In one embodiment, the outer cylinder body comprises an air inlet formed the rear end of the outer cylinder body in fluidic communication with the inflatable member; and an air inlet passage connecting the air inlet and the air chamber.

In one embodiment, the inflatable member comprises an inflatable nozzle with an inflatable channel in the middle, having one end inserted into the air inlet, and the other end extended out of the outer cylinder body and exposed on an outside environment.

In one embodiment, the outer cylinder body comprises a pressure relief port formed the front end of the outer cylinder body; and a pressure relief channel connecting the pressure relief port and the air chamber.

In one embodiment, the pressure relief member is disposed on the front end of the outer cylinder body in fluidic communication with the air chamber, and comprises a pressure relief valve configured such that when the pressure in the air chamber reaches a preset threshold value, the pressure relief valve is automatically opened to release the pressure in the air chamber to keep the air pressure in the air chamber within the threshold value, or when the outer cylinder body needs to be maintained, the pressure relief valve is manually opened to discharge the air inside the air chamber before disassembly.

In one embodiment, the pressure relief valve comprises a pressure relief valve body; a pressure relief valve core; and a pressure relief spring; wherein one end of the pressure relief valve body is fixedly installed in the pressure relief port, and the other end of the pressure relief valve body extends out and is exposed outside the outer cylinder body; wherein a middle portion of the pressure relief valve body is provided with a pressure relief chamber fluidically communicating with the pressure relief port, and the side of the pressure relief valve body is provided with a pressure relief hole communicating with the pressure relief chamber and the outside environment; and wherein the pressure relief valve core is disposed in the pressure relief chamber and is moveable therein by the pressure relief spring.

In one embodiment, the side wall of the pressure relief chamber is formed with a limiting and blocking surface that operably engages with the pressure relief valve core, such that when the pressure relief valve core is in tight contact with the limiting and blocking surface under the action of the pressure relief spring, the pressure relief valve is closed, and the air in the air chamber cannot be discharged; when air pressure in the air chamber increases and exceeds a preset threshold value, air from the air chamber enters into the pressure relief chamber through the pressure relief channel and the pressure relief port and pushes the pressure relief valve core away from the limiting and blocking surface to form a gap therebetween, the air then passes through the gap and is discharged from the pressure relief hole, thereby releasing the pressure inside the air chamber, and wherein when the air pressure in the air chamber drops to the preset threshold value, under the action of the pressure relief spring, the pressure relief valve core is pushed back to make it in tight contact with the limiting and blocking surface.

In one embodiment, the energy storage mechanism further comprises a buffer pad disposed at the front end of the inner cylinder and configured to provide blocking and buffering for the striking mechanism, wherein the middle portion of the buffer pad is provided with a through hole through which the front end of the striker mechanism is extended.

In one embodiment, the outer circumference of the buffer pad is provided with a mounting convex ring; the inner side of the front end of the outer cylinder body is provided with a limiting surface and a limiting boss; the front end of the buffer pad abuts against the limiting surface; and the front end surface of the inner cylinder abuts against the mounting convex ring and the limiting boss, thereby realizing the connections between the buffer pad, the inner cylinder and the outer cylinder body.

In one embodiment, the interior of the inner cylinder is divided into a first cavity and a second cavity with variable volumes, the first cavity is in fluidic communication with the outside environment and the second cavity is in fluidic communication with the air chamber.

In one embodiment, the inner cylinder body is provided with an inner through hole at one end close to the buffer pad for connecting the first cavity with the outside environment.

In one embodiment, the energy storage mechanism further comprises a third sealing member disposed between the outer circumference of the front end of the inner cylinder and the inner wall of the outer cylinder body; wherein the front end of the outer cylinder body is provided with an outer through hole aligned with and in fluidic communication with the inner through hole of the inner cylinder, thereby connecting the first cavity with the outside environment; and wherein the air chamber and the outer through hole are respectively located two sides of the third sealing member.

In one embodiment, the energy storage mechanism further comprises a protruding ring arranged at the outer circumference of the inner cylinder distal to the third sealing member, and a circular positioning flange disposed on the outer circumference of the inner cylinder between the protruding ring and the rear cover, and having at least one air hole defined on the circular positioning flange for air passing through, wherein the inner circumference of the circular positioning flange is sleeved on the outer circumference of the inner cylinder, and the outer circumference of the circular positioning flange is blocked by the end surface of the rear cover facing the outer cylinder body, so that the circular positioning flange is limited between the rear cover and the protruding ring. The third sealing member and the circular positioning flange are respectively disposed at the front and rear ends of the inner cylinder to support the front and rear ends of the inner cylinder.

In one embodiment, the front end of the inner cylinder is fixed to the outer cylinder body, and the rear end of the inner cylinder is fixed to the outer cylinder body through the circular positioning flange.

In one embodiment, the outer cylinder body further comprises a mounting portion formed at the front end of the outer cylinder body for mounting the transmission mechanism. The mounting portion includes a recess formed for mounting a transmission member that operably drives the striking mechanism to move in an opposite direction to the striking direction, and a mounting groove formed for accommodating the limiting member that operably limits the striking mechanism to move in the striking direction.

In one embodiment, the recess has a hole on one side wall facing the groove for partially passing the limiting member.

In another aspect of the invention, the nail gun for nailing comprises the energy storage mechanism as disclosed above. The energy storage mechanism is configured to provide energy to drive the striking mechanism to move in the striking direction, and store energy when the striking mechanism is driven to move in an opposite direction to the striking direction.

In one embodiment, the nail gun further comprises a transmission mechanism coupled with the energy storage mechanism and the striking mechanism for driving the striking mechanism to move in the opposite direction to the striking direction for storing energy.

Without intent to limit the scope of the invention, exemplary embodiments of the invention are now described in conjunction with the accompanying drawings in FIGS. 1-16.

Figure 2:
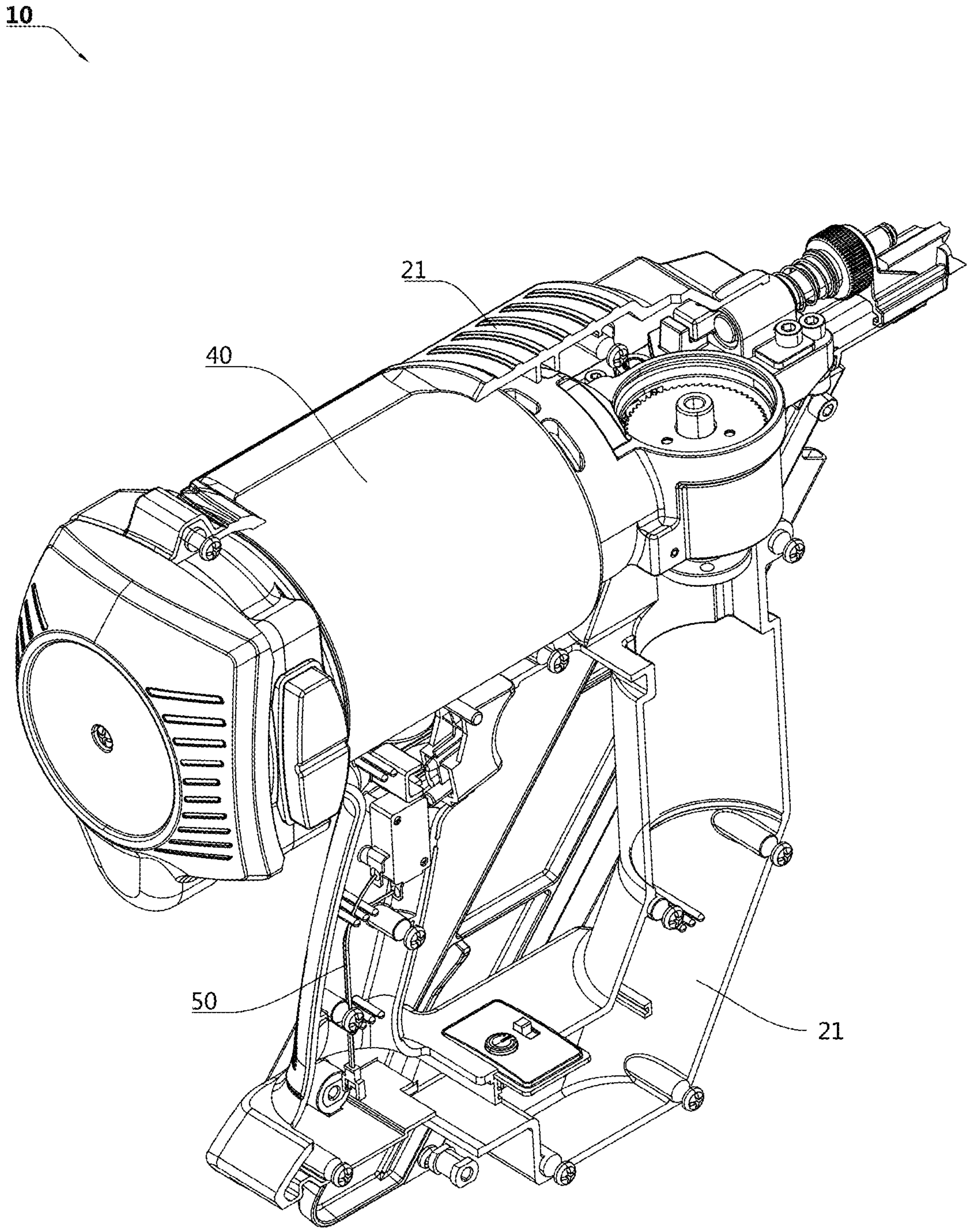
FIG. 2 shows schematically another perspective view of the nail gun shown in FIG. 1, after the casing is removed.

Referring to FIGS. 1-2, a nail gun 10 is schematically shown according to one embodiment of the invention, which is more convenient to operate and can improve safety and nail firing effect.

The nail gun 10 in the exemplary embodiment includes a housing 20, a nail magazine assembly 30 for storing nails, a driving mechanism 40 for driving a striking mechanism 41 to fire nails, and a control device 50 for controlling the driving mechanism 40 to operate. As shown in FIGS. 1-2, the housing 20 includes a casing 21. The nail magazine assembly 30 is disposed at a front end of the casing 21. The control device 50 includes components such as batteries, control boards, circuits, switches, and motors (not shown), all of which are installed inside and/or on the inner surface of the casing 21. Accordingly, the casing 21 can not only accommodate internal components such as the driving mechanism 40 and the control device 50, but also protect these internal components.

Figure 3:
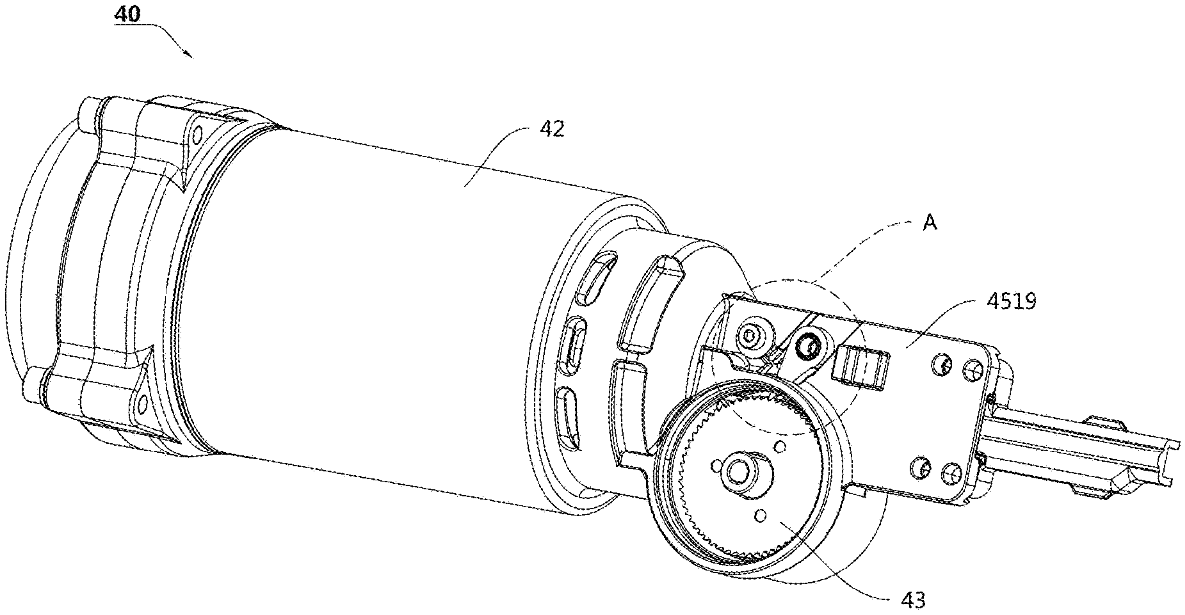
FIG. 3 shows schematically a perspective view of a driving mechanism according to one embodiment of the invention.
Figure 4:
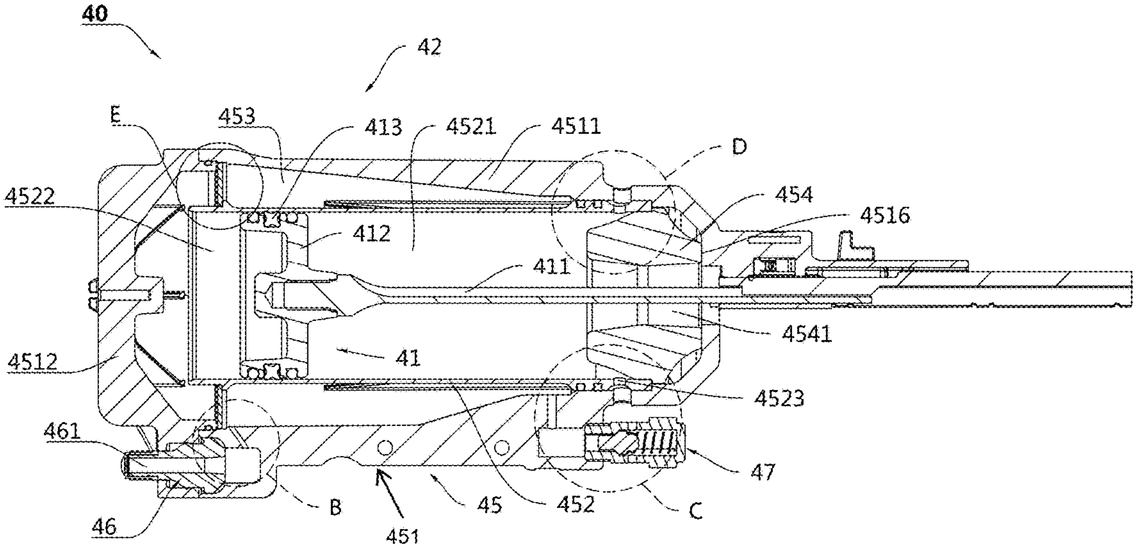
FIG. 4 shows schematically a cross sectional view of the driving mechanism shown in FIG. 3.
Figure 5:
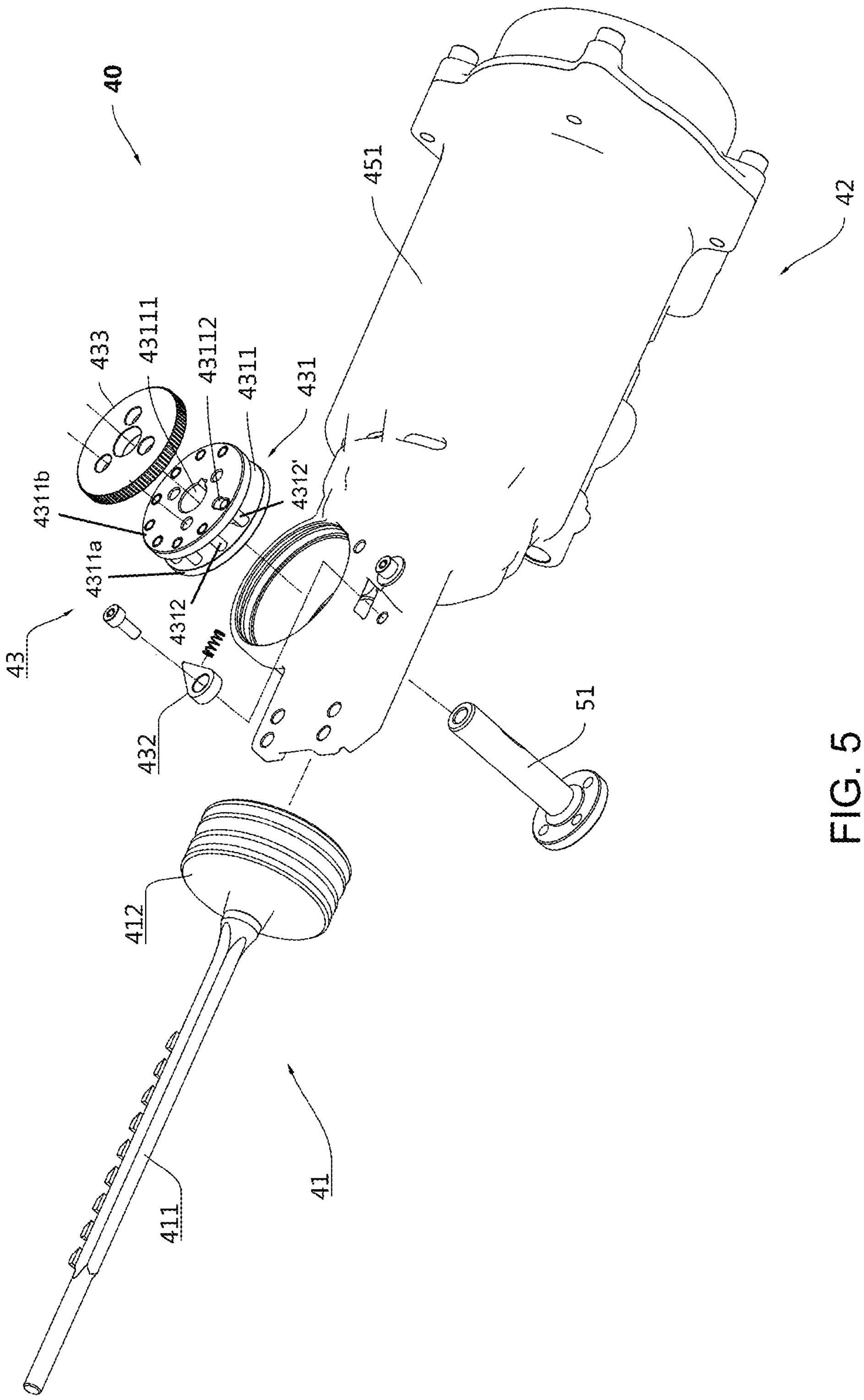
FIG. 5 shows schematically a partially exploded view of a driving mechanism according to one embodiment of the invention.

The driving mechanism 40 is arranged inside the casing 21 and is configured to act on the nail gun 10 to fire the nails. As shown in FIGS. 3-5, the driving mechanism 40 includes a striking mechanism 41 configured to strike the nails out for nailing, an energy storage mechanism 42 configured to provide the driving force (power), and a transmission mechanism 43 configured to transmit the driving force to drive the striking mechanism 41.

The striking mechanism 41 can be driven to operably move in a striking direction for striking the nails out, where the striking direction is the direction in which the nails are nailed into the nailed object. The energy storage mechanism 42 operably drives the striking mechanism 41 to carry out a forward movement along the striking direction to strike the nails. The transmission mechanism 43 operably drives the striking mechanism 41 to reversely move along the striking direction, thereby triggering the energy storage mechanism 42 to store energy therein.

The striking mechanism 41 has a striker 411 and a piston 412. The rear (inner) end of the striker 411 is installed (e.g., inserted) on the piston 412, so that the striker 411 and the piston 412 are co-movably connected to each other. The piston 412 is moveably arranged inside the energy storage mechanism 42. The front (outer) end of the striker 411 extends out of the energy storage mechanism 42 for striking the nails along the striking direction (i.e., the forward direction).

The transmission mechanism 43 has a transmission member 431 and a limiting member 432. The transmission member 431 is configured to engage with the striker 411 and drive the striker 411 to move in an opposite direction (i.e., the backward direction) of the striking direction. The limiting member 432 is configured to engage with the transmission member 431 to limit the movement of the striker 411, particularly prevent the striker 411 from misfiring, e.g., moving in the striking direction when storing energy. The transmission member 431 is provided with a limiting structure 433 that engages with the limiting member 432.

Figure 6:
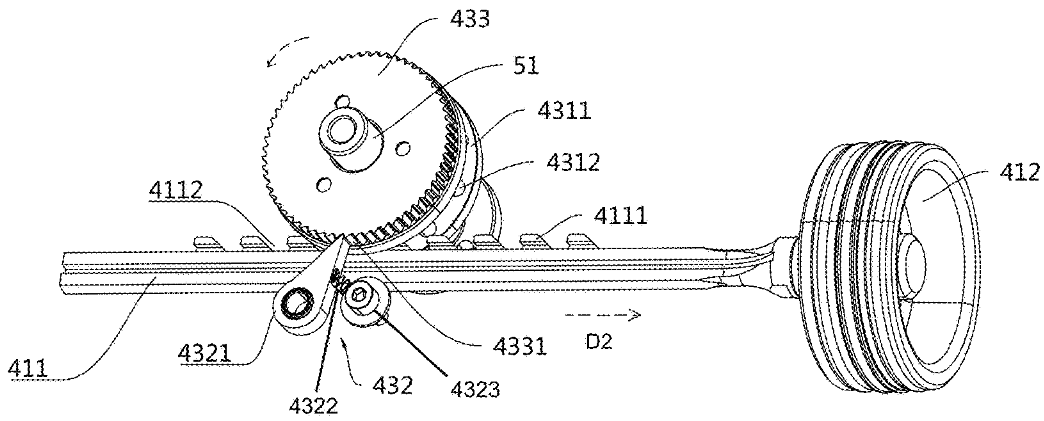
FIG. 6 shows schematically a perspective view of an engagement structure of a transmission mechanism and a striking mechanism according to one embodiment of the invention.
Figure 7:
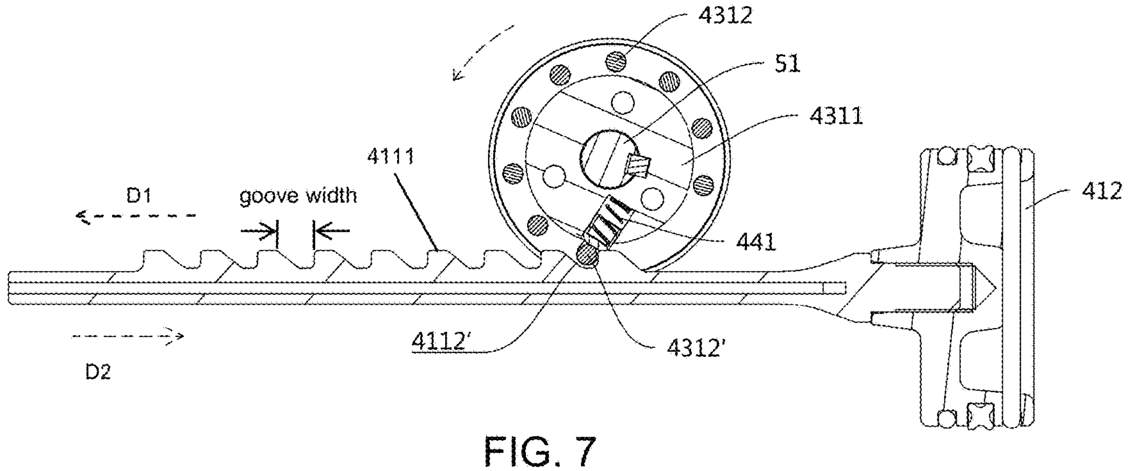
FIG. 7 shows schematically a cross sectional view of the engagement structure of the transmission mechanism and the striking mechanism shown in FIG. 6.
Figure 8:
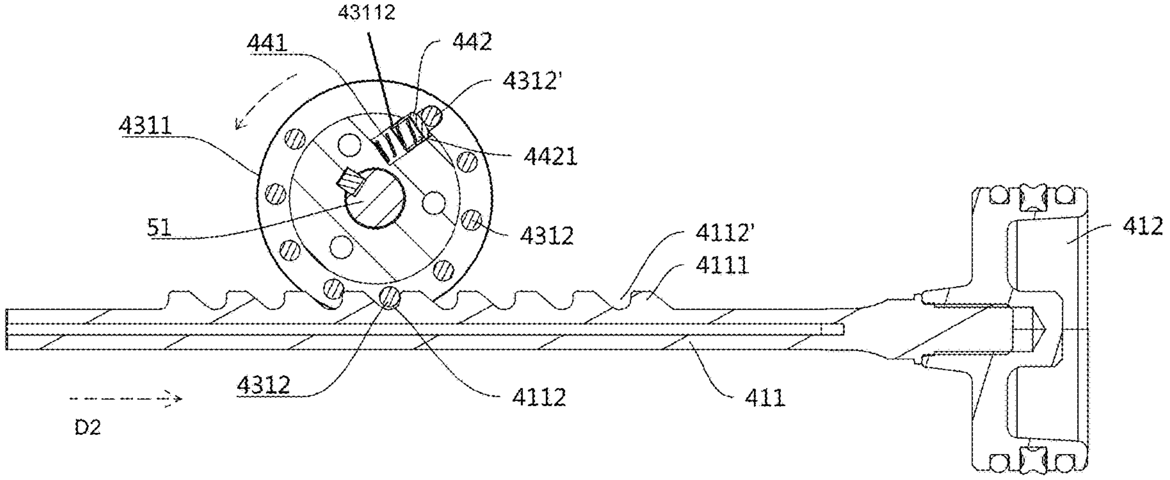
FIG. 8 shows schematically another cross-sectional view of the engagement structure of the transmission mechanism and the striking mechanism shown in FIG. 6.

FIGS. 6-8 schematically show the engagements of the transmission mechanism 43 with the striking mechanism 41 according to one embodiment of the invention.

As shown in FIGS. 6-7, one side of the striker 411 is provided with several tooth blocks 4111, and tooth grooves 4112 are formed between adjacent tooth blocks 4111. The transmission member 431 includes a rotating member 4311 and a engaging part 4312. The rotating member 4311 is a circular structure having a pair of circular disks 4311*a* and 4311*b* (FIG. 5) concentrically connected to one another to define a space therebetween, and a shaft mounting hole 43111 defined in the center thereof, through which the rotating member 4311 is installed on the output shaft 51 of the driving motor (not shown) which operably drives the rotating member 4311 to rotate. The engaging part includes a plurality of engaging pins (pinions) 4312 arranged between the pair of circular disks 4311*a* and 4311*b* of the rotating member 4311. Specifically, the rotating member 4311 has a plurality of pin mounting holes defined on its circumference portion, and the plurality of engaging pins 4312 is respectively disposed/inserted in the plurality of pin mounting holes. The engaging pins 4312 are operably received by the tooth grooves 4112 on the striker 411, as shown in FIG. 7, thereby realizing the engagement between the transmission member 431 and the striker 411. When the rotating member 4311 is driven by the driving motor to rotate counterclockwise, the engaging pins 4312 of the transmission member 431 are sequentially embedded (meshed or mated) in the tooth grooves 4112 of the striker 411, thereby driving the striker 411 to move in a direction opposite to the striking direction of the striker 411. When the rotating member 4311 rotates counterclockwise, the sequential engagement of the engaging pins 4312 with the tooth grooves 4112 on the striker 411 drives the striker 411 to move to in a backward direction, as shown by the arrow D2 in FIGS. 6-7, which is opposite of the striking direction D1 (i.e., the forward direction), as shown in FIG. 7.

As shown in FIGS. 7-8, the plurality of engaging pins 4312 includes at least one movable engaging pin (pinion) 4312'. The plurality of pin mounting holes of the rotating member 4311 includes an oblong hole (i.e., accommodating cavity) 43112 configured to receive the movable engaging pin 4312' and allow the movable engaging pin 4312' to operably move therein. An clastic assembly is provided between the movable engaging pin 4312' and the rotating member 4311. The clastic assembly has a first spring 441 with one end acting on (abutting against) the rotating member 4311, and the other end acting on (abutting against) the movable engaging pin 4312'. In one embodiment, the first spring 441 is installed and accommodated in the accommodating cavity 43112. The elastic assembly also has a top block 442 located between the first spring 441 and the movable engaging pin 4312'. The side of the top block 442 facing the first spring 441 is provided with a limiting hole 4421 in which the first spring 441 is inserted, or a limiting column on which the first spring 441 is sleeved. The side of the top block 442 facing the movable engaging pin 4312' is provided with an active surface in contact with the movable engaging pin 4312'.

Each engaging pin 4312 (4312') of the transmission member 431 corresponds to a tooth groove 4112 of the striker 411 one by one. In one embodiment, nine (9) engaging pins 4312 (4312') are utilized. The movable engaging pin 4312' of the transmission member 431 is used as the first engaging pin that is meshed into the first tooth groove 4112' of the striker 411. Among them, setting the first engaging pin to be movable ensures that the first engaging pin can be better embedded in the first tooth groove 4112' of the striker 411.

For example, when triggered, if the movable engaging pin 4312' is just in contact with the tooth block 4111 of the striker 411, since the movable engaging pin 4312' is set to be movable, the movable engaging pin 4312' will be pushed to move slightly in the oblong hole 43112 under the reaction force of the tooth block 4111, and then embedded in the first tooth groove 4112' under the action of the first spring 441 (as shown in FIG. 7), so that the first engaging pin 4312' and the first tooth groove 4112' are engaged with each other normally, thereby avoiding situations such as jamming. When the engaging pins 4312 follow the rotating member 4311 to continuously rotate counterclockwise, each engaging pin is sequentially inserted into each corresponding tooth groove, thereby driving the striker 411 to move in the direction D2 that is opposite of the striking direction D1, as shown in FIG. 8.

In the counterclockwise direction, the engaging pins between the first engaging pin and the n-th engaging pin are evenly arranged at the edge portion of the rotating member 4311, such that two adjacent engaging pins 4312 define a first gap of the same distance therebetween. In the clockwise direction, a second gap is defined between the first engaging pin and the n-th engaging pin. The second gap is larger than the first gap. When the rotating member 4311 rotates to the second gap towards the striker 411, the rotating member 4311 and the striker 411 are in an empty tooth state at this point, i.e., the rotating member 4311 and the striker 411 are disengaged from each other, since there is no engaging pin in the second gap. Accordingly, the striker 411 in this state can be triggered by the energy storage mechanism 42 to move along the striking direction, thereby firing the nails.

As shown in FIG. 6, the limiting structure 433 is a ratchet coaxially and co-movably arranged with the rotating member 4311. Both the ratchet 433 and the rotating member 4311 are sleeved on the output shaft 51 of the driving motor and are fixedly connected together so that the ratchet 433 operably rotates synchronously with the rotating member 4311 under the drive of the driving motor. The outer circumference of the ratchet 433 is provided with a number of ratchet teeth 4331. The limiting member 432 has a pawl 4321 that is configured to be inserted between adjacent ratchet teeth 4331 to engage with the ratchet teeth 4331. As shown in FIG. 6, the distance between adjacent ratchet teeth 4331 of the ratchet 433 is smaller than the groove width (i.e., a distance between two adjacent of the tooth grooves 4111 of the striker 411, as shown in FIG. 7), so that the pawl 4321 and the ratchet teeth 4331 can be more tightly and securely engaged when mated, thereby preventing from falling out.

In the exemplary embodiment, since the distance between the ratchet teeth 4331 is much smaller than the width of the tooth groove 4112, the mutual engagement between the pawl 4321 and the ratchet teeth 4331 is much tighter and firmer. Compared with the prior art where the ratchet is directly matched with the tooth groove 4112, the problem of ratchet detachment in the prior art will not occur according to the invention. Of course, setting the spacing between adjacent ratchets 4331 to be equal to or greater than the width of the tooth grooves 4112 can also achieve a position-limiting effect, but its effect is much less than that of the adjacent ratchet teeth 4331 with the spacing therebetween being less than the width of the tooth groove 4112.

In some embodiments, the limiting structure 433 can also be a ratchet that is integrally provided directly on the rotating member 4311, that is, the rotating member 4311 is set to be thicker, and the ratchet is directly arranged on the outer circumference of the upper part of the rotating member 4311. Such an arrangement can not only ensure that the limiting structure 433 and the rotating member 4311 keep synchronous rotation, but also reduce parts. However, the arrangement may have higher requirements on the manufacture of the ratchet and the rotating member.

As shown in FIG. 4, the energy storage mechanism 42 includes an energy storage member 45, an inflatable member 46 and a pressure relief member 47. The energy storage member 45 has an outer cylinder 451 and an inner cylinder 452. The outer cylinder 451 includes an outer cylinder body 4511 and a rear cover 4512 detachably attached onto the rear end of the outer cylinder body 4511 to cover the outer cylinder body 4511. The inner side of the outer cylinder body 4511 forms an air chamber 453. In one embodiment, the air chamber 453 is formed between the outer cylinder 451 and the inner cylinder 452.

The inner cylinder 452 has a long cylindrical structure and is installed inside the outer cylinder body 4511. The striking mechanism 41 is installed inside the inner cylinder 452. The outer circumference of the piston 412 of the striking mechanism 41 is close to the inner wall of the inner cylinder 452, and a second sealing member (e.g., sealing ring) 413 is pressed between the piston 412 and the inner wall of the inner cylinder 452. The piston 412 is fixed with a striker 411, and the front end of the striker 411 extends out of the inner cylinder 452, and the front end of the outer cylinder body 4511 is engaged with the transmission member 431.

Figure 10:
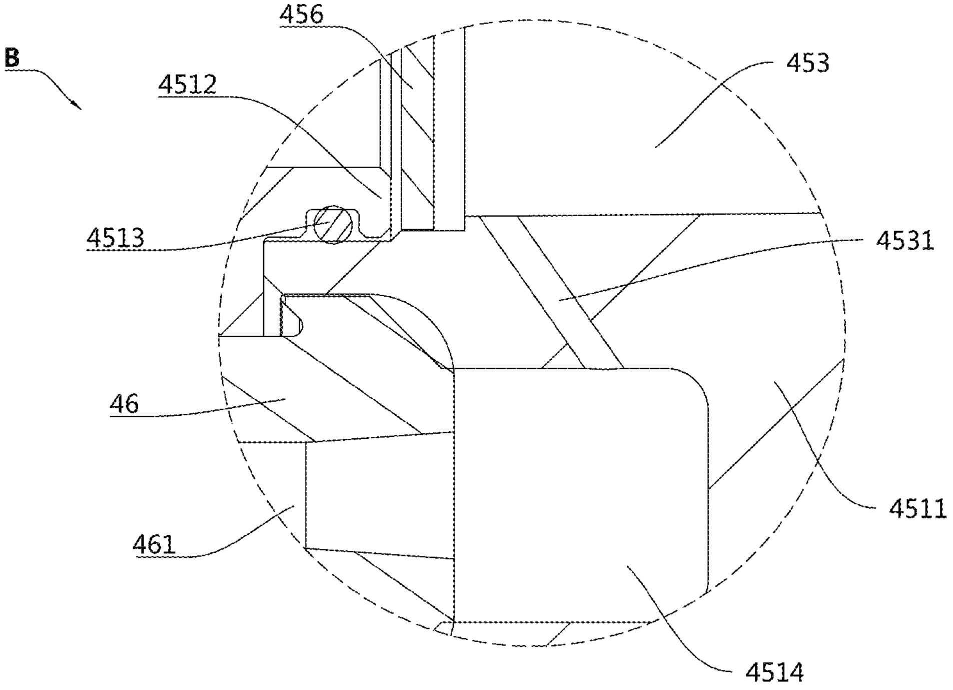
FIG. 10 shows schematically a partial enlarged view of part B shown in FIG. 4.

As shown in FIG. 4, the piston 412 and the second sealing member 413 divide the interior of the inner cylinder 452 into two separate parts, i.e., a first cavity 4521 and a second cavity 4522, and the volumes of the first cavity 4521 and the second cavity 4522 change during the moving of the piston 412. The second cavity 4522 is in fluidic communication with the air chamber 453. The first cavity 4521 is separated from the second cavity 4522 and is in fluidic communication with the outside environment. The front end of the inner cylinder 452 is provided with an inner through hole 4523 that connects the first cavity 4521 with the outside environment. The rear cover 4512 is configured in a detachable form to facilitate the disassembly of the outer cylinder body 4511 to replace or repair the striking mechanism 41. To form a sealed space (state) inside the air chamber 453, a first sealing member 4513 is placed at the connection between the rear cover 4512 and the outer cylinder body 4511 to enhance the tightness of the connection between the rear cover 4512 and the outer cylinder body 4511 and avoid the generation of air leakage in the air chamber 453. In one embodiment, a sealing ring is used as the first sealing member 4513, as shown in FIG. 10.

In some embodiments, the air chamber 453 is filled with air or nitrogen. Since the striking mechanism 41 is installed inside the inner cylinder 452, when the striker 411 is driven by the transmission member 431 to move, the piston 412 will move towards the direction of the second cavity 4522, the volume of the second cavity 4522 gradually decreases, so that the air in the air chamber 453 is compressed, and the air pressure inside the air chamber 453 gradually increases, thereby realizing energy storage. When the rotating member 4311 of the transmission member 431 rotates to the second gap and faces the striker 411, that is, when the striker 411 is in the empty tooth state, under the air pressure in the air chamber 453, the striking mechanism 41 is pushed out along the striking direction, thereby realizing nailing.

To replenish the air in the air chamber 453 conveniently, the inflatable member 46 is specially provided at the rear end of the outer cylinder body 4511 close to the rear cover 4512. As shown in FIGS. 4 and 10, the outer cylinder body 4511 is provided with an air inlet 4514 near the rear cover 4512, and an air inlet passage 4531 connecting the air chamber 453 and the air inlet 4514 is provided on the outer cylinder body 4511 on the side of the air inlet 4514.

The inflatable member 46 is an inflatable nozzle with an inflatable channel 461 in the middle, one end of the inflatable nozzle is inserted at the air inlet 4514, and the other end extends out of the outer cylinder body 4511 and is exposed on the outside environment, which is convenient for users to inflate the inflatable nozzle.

Figure 11:
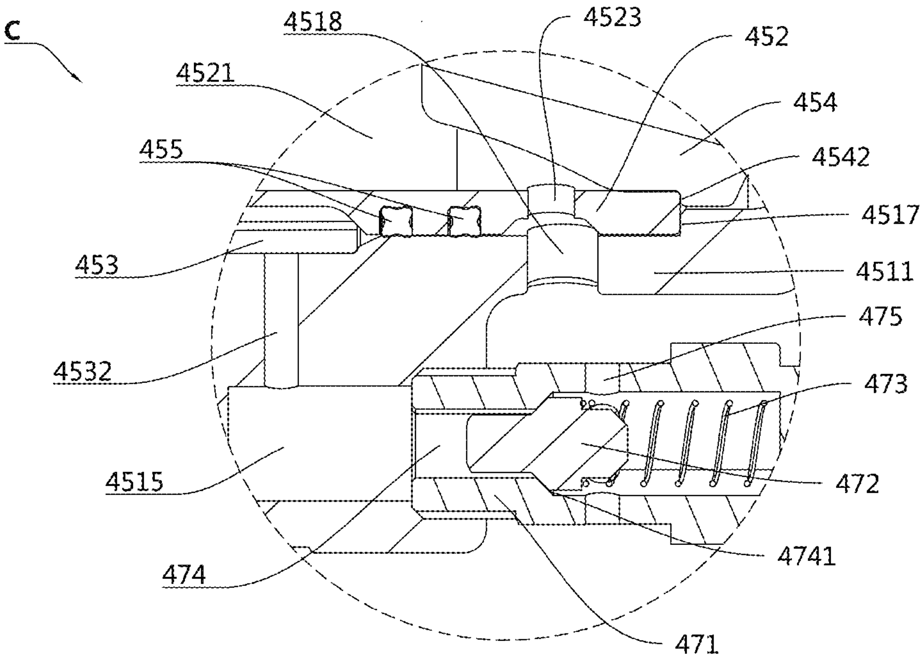
FIG. 11 shows schematically a partial enlarged view of part C shown in FIG. 4.

As shown in FIGS. 4 and 11, one side of the front end of the outer cylinder body 4511 is provided with a pressure relief member 47. In one embodiment, the pressure relief member 47 is an automatic pressure relief valve. When the air pressure in the air chamber 453 gradually increases and reaches a preset threshold value, the automatic pressure relief valve will automatically open to release the pressure in the air chamber 453, so that the air pressure in the air chamber 453 is always kept within the threshold value, thereby ensuring the safety inside the outer cylinder body 4511. In addition, the outer end of the pressure relief member 47 is exposed on the outside of the outer cylinder body 4511. When the user needs to disassemble and inspect the outer cylinder body, the pressure relief valve can also be opened manually to discharge the air inside the air chamber 453 before disassembly, thereby avoiding the high air pressure inside the air chamber 453 to cause the striker 411 to be accidentally fired and hurt the user, and enhancing the safety of the nail gun.

Specifically, as shown in FIG. 11, a pressure relief port 4515 is provided on one side of the front end of the outer cylinder body 4511, and a pressure relief channel 4532 connecting the pressure relief port 4515 and the air chamber 453 is provided on the outer cylinder body 4511. The automatic pressure relief valve has a pressure relief valve body 471, a pressure relief valve core 472, and a pressure relief spring 473. One end of the pressure relief valve body 471 is fixedly installed in the pressure relief port 4515, and the other end extends out and is exposed outside the outer cylinder body 4511. The middle portion of the pressure relief valve body 471 is provided with a pressure relief chamber 474 fluidically communicating with the pressure relief port 4515, and the side of the pressure relief valve body 471 is provided with a pressure relief hole 475 communicating with the pressure relief chamber 474 and the outside environment. The pressure relief valve core 472 is disposed in the pressure relief chamber 474 and is moveable therein by the pressure relief spring 473. The side wall of the pressure relief chamber 474 is formed with a limiting and blocking surface 4741 that operably engages with the pressure relief valve core 472. When the automatic pressure relief valve is closed, the pressure relief valve core 472 is blocked at the connection between the pressure relief chamber 474 and the pressure relief port 4515 under the action of the pressure relief spring 473. At this point, the pressure relief valve core

472 and the limiting and blocking surface 4741 is in tight contact with each other, and the air in the air chamber 453 cannot be discharged. When the air pressure in the air chamber 453 gradually increases and exceeds the preset threshold value, the air from the air chamber 453 will enter into the pressure relief chamber 474 through the pressure relief channel 4532 and the pressure relief port 4515 and gradually pushes the pressure relief valve core 472. When the pressure relief valve core 472 is pushed away from the limiting and blocking surface 4741 to form a gap therebetween, the air can pass through the gap and be discharged from the pressure relief hole 475, thereby releasing the pressure inside the air chamber 453. When the air pressure in the air chamber 453 drops to a preset threshold value, under the action of the pressure relief spring 473, the pressure relief valve core 472 will be pushed back to make it in tight contact with the limiting and blocking surface 4741. The automatic pressure relief valve does not need to be activated manually during operation and can be automatically opened according to changes inside the air chamber 453 to protect the air chamber 453.

As shown in FIG. 4, the front end of the inner cylinder 452 is fixedly connected to the front end of the outer cylinder 451, and a buffer pad 454 is provided at the joint of them. The buffer pad 454 is configured to provide blocking and buffering for the piston 412 to prevent it from directly colliding with the inner surface of the outer cylinder body and protect the piston 412. In one embodiment, the middle portion of the buffer pad 454 is provided with a through hole 4541 through which the front end of the striker 411 is extended. The inner end surface of the buffer pad 454 is used for buffering the piston 412. When the piston 412 is pushed forward by the air pressure in the air chamber 453 to move forward in the striking direction, and the piston 412 can move until it is blocked by the buffer pad 454.

Figure 12:
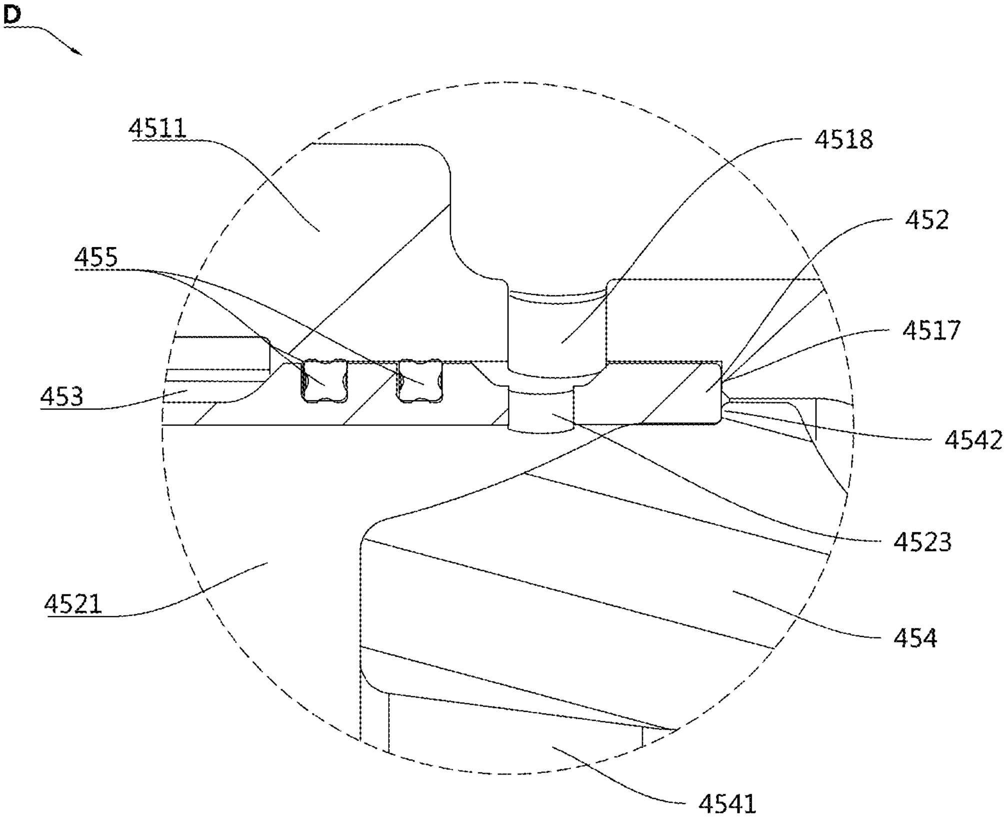
FIG. 12 shows schematically a partial enlarged view of part D shown in FIG. 4.

In some embodiments, as shown in FIGS. 11 and 12, the specific installation structure of the buffer pad 454 is as follows: the inner cylinder 452 is a long cylindrical structure; the outer circumference of the buffer pad 454 is formed with a mounting convex ring 4542; the inner side of the front end of the outer cylinder body 4511 is provided with a limiting surface 4516 and a limiting boss 4517 (FIG. 14); the front end of the buffer pad 454 abuts against the limiting surface 4516 (FIG. 4); and the front end surface of the inner cylinder 452 abuts against the mounting convex ring 4542 and the limiting boss 4517, thereby realizing the connections between the buffer pad 454, the inner cylinder 452 and the outer cylinder body 4511.

As shown in FIG. 12, a third sealing member 455 is provided between the outer circumference of the inner cylinder 452 and the inner wall of the outer cylinder body 4511. In one embodiment, the third sealing member 455 is two sealing rings. The front end of the outer cylinder body 4511 is provided with an outer through hole 4518 outside the inner through hole 4523. The inner through hole 4523 and the outer through hole 4518 are connected, thereby connecting the first cavity 4521 with the outside environment.

In the transverse section, the inner through hole 4523 and the outer through hole 4518 are located at the front side of the third scaling member, the air chamber 453 is located at the rear side of the third sealing member, such that the third sealing member 455 can not only strengthen the tightness of the connection, but also separates the air chamber 453 from the first cavity 4521 to form two independent spaces, so as to prevent the air chamber 453 from communicating with the outside environment and being affected by the external air pressure.

Figure 13:
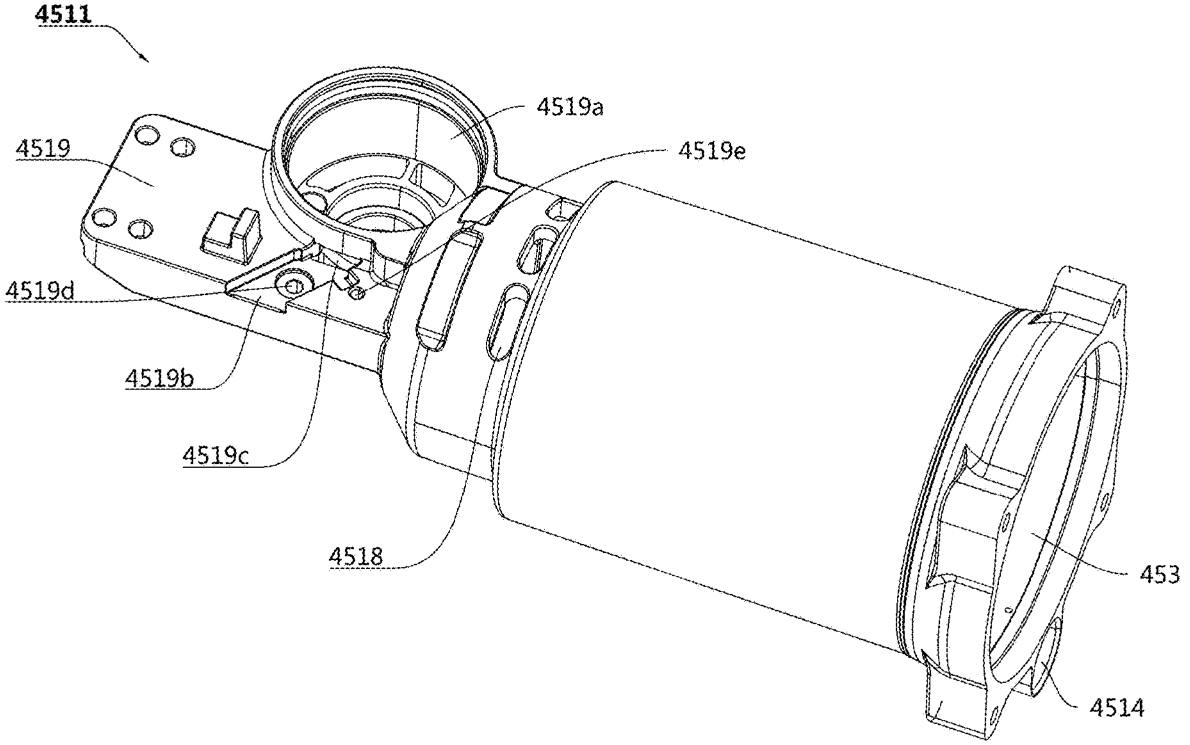
FIG. 13 shows schematically a perspective view of an outer cylinder body according to one embodiment of the invention.
Figure 14:
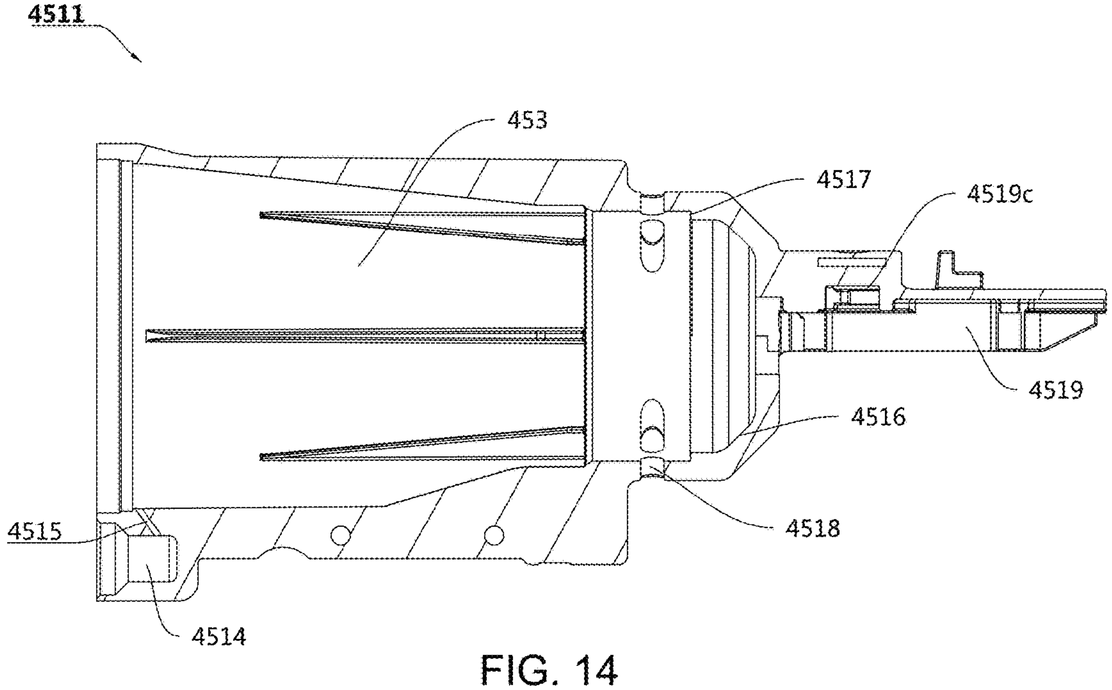
FIG. 14 shows schematically a cross sectional view of an outer cylinder body according to one embodiment of the invention.

As shown in FIG. 13, the front end of the outer cylinder body 4511 is provided with a mounting portion 4519. The mounting portion 4519 includes a recess 4519*a* formed for mounting the transmission member 431 thereon. The recess 4519*a* has a shape configured to match that of the rotating member 431 of the transmission member 431, i.e., a circular shape. The mounting portion 4519 also includes a mounting groove 4519*b* formed on one side of the recess 4519*a*, wherein as assembled, the pawl 4321 of the limiting member 432 is accommodated in the mounting groove 4519*b*. The side wall of the recess 4519*a* facing the mounting groove 4519*b* is provided with a hole 4519*c* for one end of the pawl 4321 to pass through.

Figure 9:
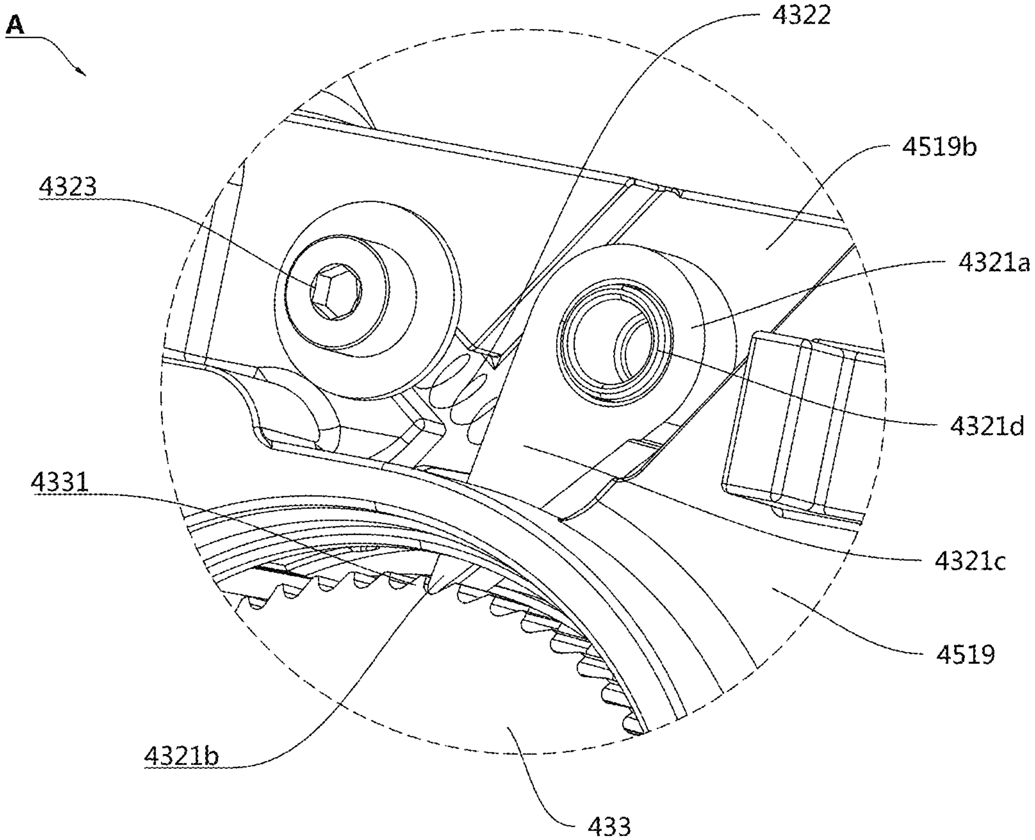
FIG. 9 shows schematically a partial enlarged view of part A shown in FIG. 3.

As shown in FIG. 9, the pawl 4321 has a positioning end 4321*a*, a limiting end 4321*b* and a middle portion 4321*c* formed between the positioning end 4321*a* and the limiting end 4321*b*. The positioning end 4321*a* is rotatably mounted on the mounting groove 4519*b* through a rotating shaft 4321*d*. The limiting end 4321*b* passes through the hole 4519*c* on the side wall of the recess 4519*a* and extends into the recess 4519*a* and engages with the ratchet teeth 4331 of the ratchet 433 installed in the recess 4519*a*. A second spring 4322 is provided between the middle portion 4321*c* and a positioning screw 4323 mounted on the mounting portion 4519 so that both ends of the second spring 4322 abut against the middle portion 4321*c* and the positioning screw 4323, respectively. As such, under the action of the second spring 4322, the limiting end 4321*b* of the pawl 4321 can be better engaged with the ratchet teeth 4331 to ensure the limiting end 4321*b* to be meshed well with the ratchet teeth 4331, thereby avoiding a reverse rotation of the ratchet 433. As shown in FIG. 13, the mounting portion 4519 further includes positioning holes 4519*d* and 4519*e* provided corresponding to the rotating shaft 4321*d* and the positioning screw 4323 for mounting the rotating shaft 4321*d* and the positioning screw 4323, respectively. The engagement of the pawl 4321 with the ratchet teeth 4331 prevents the ratchet 433 from rotating in reverse. The ratchet 433 and the rotating member 4311 are coaxially arranged, which prevents the rotating member 4311 from rotating in the opposite direction, thereby preventing the striker 411 from being accidentally fired, and providing greater safety.

Figure 15:
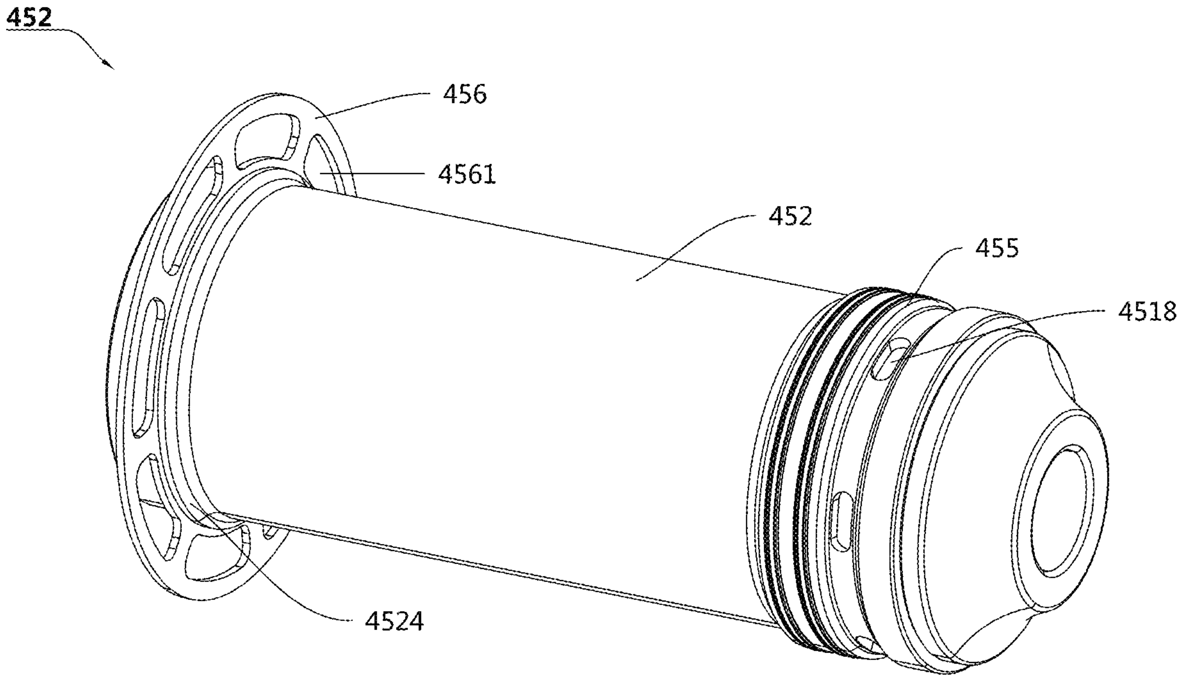
FIG. 15 shows schematically a perspective view of an inner cylinder body according to one embodiment of the invention.
Figure 16:
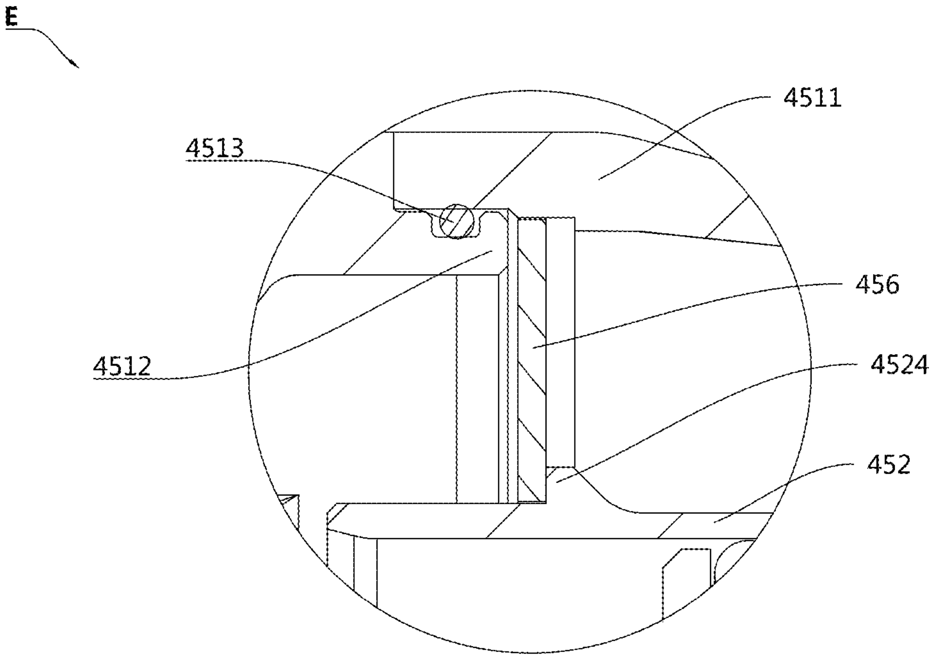
FIG. 16 shows schematically a partial enlarged view of part E shown in FIG. 4.

As shown in FIG. 15, a structural diagram of the inner cylinder is shown according to one embodiment of the invention. FIG. 16 is a partial enlarged view of E in FIG. 4.

As shown in FIG. 4, the inner cylinder 452 is installed inside the outer cylinder body 4511, and the front end of the inner cylinder 452 is connected with the inner wall of the outer cylinder body 4511 through the third sealing member 455 and is locked and limited. In order to allow the inner cylinder 452 to be more stably arranged inside the outer cylinder body 4511, as shown in FIG. 15, a protruding ring 4524 is arranged at the rear end of the inner cylinder 452 away from the third sealing member 455, and a circular positioning flange 456 is arranged on one side of the protruding ring 4524, and one or more air holes 4561 are opened on the circular positioning flange 456 for air to pass through. As shown in FIG. 16, the inner circumference of the circular positioning flange 456 is sleeved on the outer circumference of the inner cylinder 452, and one side is supported by the protruding ring 4524, and the outer circumference of the circular positioning flange 456 is blocked by the end surface of the rear cover 4512 facing the outer cylinder body 4511, so that the circular positioning flange 456 can be limited between the rear cover 4512 and the protruding ring 4524, thereby enhancing the connection stability between the structures. The third scaling member 455 and the circular positioning flange 456 are respectively provided at the front and rear ends of the inner cylinder 452 to support the front and rear ends of the inner cylinder 452, so that the inner cylinder 452 can be more stably fixed inside the outer cylinder body 4511.

According to the embodiments of the invention, in operation, the driving motor in the control device 50 of the nail gun drives the transmission member 431 to rotate. During the rotation process, the rotating member 4311 sequentially contacts with the teeth on the striker 411 from the first engaging pin (movable engaging pin 4312') to engaged with the tooth grooves 4112 of the striker 411, thereby driving the striker 411 and the piston 412 to move in the opposite direction (i.e., the backward direction) of the striking direction inside the inner cylinder 452. During the movement of the piston 412, the volume of the second cavity 4522 gradually becomes smaller, thereby compressing the air in the air chamber 453, and the air pressure in the air chamber 453 gradually rises to store energy. When the rotating member 4311 continues to rotate to form an empty tooth state with the striker 411, the air pressure in the air chamber 45 pushes the piston 412 and the striker 411 are pushed out along the striking direction, so that the striker 411 drives the nail out to complete nail firing.

During the rotation of the rotating member 4311, the ratchet also rotates along with the rotating member 4311, and the pawl 4321 engages with the ratchet tooth 4331 on the outer circumference of the ratchet to prevent the ratchet from reversing, thereby avoiding misfiring of the striker during the working process and enhancing safety.

In one exemplary embodiment, the striker can be replaced as follows.

When the nail gun stops working, first removing the nail magazine assembly 30 and the casing 21, then removing the pressure relief member 47 to relieve the pressure inside the air cavity 453, then removing the rear cover 4512 on the rear side of the outer cylinder body 4511, taking out the striking mechanism 41 located inside the inner cylinder body 452, and replacing the striker 411. Meanwhile, if the transmission member 431 also needs to be replaced, then removing the transmission component 431 for replacement, then installing the striking mechanism 41 into the inner cylinder body 452, putting the rear cover 4512 in, and then connecting inflation equipment to the inflation component 46 to inflate the inside of the air cavity 453. After the inflation is completed, reinstalling the casing 21, and installing the corresponding nail magazine assembly 30 to continue nailing.

According to the driving mechanism for the nail gun of the invention, since the limiting structure 433 (e.g., a ratchet) engaging with the limiting member 432 for limiting the movement of the striker 411 is directly provided on the transmission member 431, there is no need to provide another structure engaging with the limiting member 432 on the striker 411, thereby simplifying the structure of the striker 411. Moreover, since there is no direct contact between the limiting member 432 and the striker 411, there is no need to release the limiting relationship between the limiting member 432 when the striker 411 is fired, that is, there is no need to provide a driving device such as a solenoid valve at the limiting member 432 to drive the limiting member 432 to rotate, thereby simplifying the structure and reducing the cost, solving the defects caused by the failure of the solenoid valve, and making the entire nail gun more efficient, stable and safer when working.

The transmission member 431 in one embodiment includes a rotating member 4311 and a engaging part. The rotating member 4311 is configured to connect with the driving motor of the nail gun and is driven to rotate by the driving motor. The engaging part is a plurality of engaging pins 4312 distributed in the rotating member 4311. The engaging pin 4312 operably engages with the tooth groove 4112 of the striker 411, so as to realize the engagement between the transmission member 431 and the striker 411 and drive the striker 411 to move. Compared with the engagement between the gear and the rack, the engagement between the engaging pin 4312 and the tooth groove 4112 is easier to engage, so the transmission is more stable.

The limiting structure 433 in one embodiment is a ratchet coaxially arranged with the rotating member 4311. The ratchet 433 has a number of ratchet teeth 4331 arranged on its outer circumference. The limiting member 432 includes a pawl 4321 that operably engages with the ratchet teeth 4331 of the ratchet 433 and is configured to embed between two adjacent ratchet teeth 4331. The ratchet 433 is arranged to be coaxial with the rotating member 4311, so that the rotating member 4311 and the ratchet 433 can rotate synchronously, and the pawl 4321 engages with the ratchet teeth 4331 to limit the reverse rotation of the rotating member 4311, thereby realizing the movement limit of the striker 411, i.e., preventing the striker 411 from misfiring. Accordingly, the safety of the nail gun is improved. The ratchet 433 and the rotating member 4311 are directly driven by the same driving motor, without the need for an additional power source, which simplifies the structure, reduces the cost, reduces the weight of the nail gun, and makes the nail gun easy to carry and use.

The distance between the ratchet teeth 4331 on the ratchet in one embodiment is smaller than the groove width of the tooth groove 4112 on the striker 411, which has a more stable connection than the pawl 4321 directly mating with the tooth groove 4112. The smaller the distance, the higher the fitting tightness and fitting accuracy of the pawl 4321, which greatly reduces or even eliminates the possibility of the pawl 4321 being detached, thereby reducing the probability of the striker 411 being misfired and improving safety performance.

In one embodiment, at least one of the engaging pins 4312 is a movable engaging pin 4312'. When the transmission member 431 and the striker 411 engage with each other, the engaging pins 4312 need to be inserted into the tooth grooves 4112 one by one. Conventionally, the engaging pin 4312 may not be completely aligned with the tooth groove 4112, resulting in the engaging pin 4312 directly colliding with the tooth block 4111 and being unable to engage and drive normally and getting jamming. However, according to the invention, at least one of the engaging pins 4312 is set to be movable. When the movable engaging pin 4312' collides with the tooth block 4111, the movable engaging pin 4312' will move slightly under the action of the impact force and accurately embed into the tooth groove 4112, so as to avoid the transmission member 431 and the striker 411 from getting jamming, thereby avoiding personal injury caused by misfiring of the nail due to the jamming, and further enhancing safety.

The energy storage mechanism in one embodiment includes an inner cylinder 452 and an outer cylinder 451, and an air chamber is set between the inner and outer cylinders. The inner cylinder 452 is set inside the outer cylinder body 4511 of the outer cylinder 451. The inner cylinder 452 is provided with the striking mechanism 41. The transmission mechanism 43 drives the striking mechanism 41 to achieve the change of air pressure in the air chamber to achieve nailing. The rear side of the outer cylinder body 4511 is provided with a detachable rear cover 4512, which is convenient for disassembly to maintain or replace the striking mechanism 41 located inside the inner cylinder 452.

The energy storage mechanism 42 in one embodiment is provided with a pressure relief member 47 in fluidic communication with the air chamber 453. When the air pressure in the air chamber 453 increases and exceeds the preset safety critical value, the pressure relief member 47 will automatically open to relieve the pressure in the air chamber 453, so that the air pressure in the air chamber can always be within the safety critical value, ensuring the safety performance of the nail gun. In addition, the energy storage mechanism 42 is also provided with an inflatable member 46 in fluidic communication with the air chamber 453, which can inflate the inside of the air chamber 453 when necessary, which is very convenient.

The outer cylinder 451 in one embodiment is directly integrally formed with the mounting portion 4519, and the mounting portion 4519 is used to mount the transmission member 431. The mounting portion 4519 is made into a universal part. When different nails are needed, it is only necessary to replace the corresponding striker 411 and the transmission member 431 without replacing the entire device, and the applicability is wide. When the user needs to carry out construction in various situations, there is no need to carry a nail gun with various nails, but only to carry the appropriate striker and the transmission member, which is very convenient to carry.

In addition, because of use of a pressure relief member and an inflatable member, when the user needs to replace the striker, the pressure relief member can be removed first to discharge the air inside the air chamber, and then the rear cover body can be disassembled to remove the piston and the striker, and finally the striker can be replaced and reinstalled, and the air chamber can be inflated again through the inflatable member for continued use. If the casing is directly disassembled without first relieving the pressure and exhausting the air chamber, it is easy to cause the striker to misfire, so the pressure relief member can also be used as a safety component to improve the safety of the nail gun.

Since the embodiments provide a circular positioning flange between the inner cylinder body and the outer cylinder body, two support points are formed between the inner cylinder body and the outer cylinder body, one of which is where the inner cylinder body and the outer cylinder body are fixed, and the other is where the circular positioning flange is located. The two support points provide a more stable support for the inner cylinder body to prevent the inner cylinder body from being separated from the outer cylinder body and causing damage.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

Some references, which may include patents, patent applications and various publications, are cited and discussed in the description of this invention. The citation and/or discussion of such references is provided merely to clarify the description of the invention and is not an admission that any such reference is "prior art" to the invention described herein. All references cited and discussed in this specification are incorporated herein by reference in their entireties and to the same extent as if each reference was individually incorporated by reference.

What is claimed is:

1. An energy storage mechanism used for a nail gun for nailing, coupled with a striking mechanism for striking nails out of the nail gun along a striking direction, comprising:

an energy storage member comprising an air chamber for containing air; an inner cylinder body for installing the striking mechanism therein; and an outer cylinder arranged outside the inner cylinder, such that the air chamber is formed between the outer cylinder and the inner cylinder;

an inflatable member disposed on the energy storage member and configured to inflate the air chamber; and a pressure relief member disposed on the energy storage member and configured to release the pressure in the air chamber, wherein the outer cylinder comprises an outer cylinder body comprising a pressure relief port formed the front end of the outer cylinder body; and a pressure relief channel connecting the pressure relief port and the air chamber; and wherein the pressure relief member is disposed on the front end of the outer cylinder body in fluidic communication with the air chamber, and comprises a pressure relief valve configured to be automatically opened to release the pressure in the air chamber when the pressure in the air chamber reaches a preset threshold value, and manually opened to discharge the air inside the air chamber before disassembly when the outer cylinder body needs to be maintained.

2. The energy storage mechanism of claim 1, wherein the outer cylinder further comprises:

a rear cover detachably attached onto the rear end of the outer cylinder body to cover the outer cylinder body; and a first sealing member placed at the connection between the rear cover and the outer cylinder body for forming a sealed state between the rear cover body and the outer cylinder body.

3. The energy storage mechanism of claim 1, wherein the outer cylinder body further comprises:

an air inlet formed the rear end of the outer cylinder body in fluidic communication with the inflatable member; and an air inlet passage connecting the air inlet and the air chamber.

4. The energy storage mechanism of claim 3, wherein the inflatable member comprises an inflatable nozzle with an inflatable channel in the middle, having one end inserted into the air inlet, and the other end extended out of the outer cylinder body and exposed on an outside environment.

5. The energy storage mechanism of claim 1, wherein the pressure relief valve comprises a pressure relief valve body;

a pressure relief valve core; and a pressure relief spring;

wherein one end of the pressure relief valve body is fixedly installed in the pressure relief port, and the other end of the pressure relief valve body extends out and is exposed outside the outer cylinder body;

wherein a middle portion of the pressure relief valve body is provided with a pressure relief chamber fluidically communicating with the pressure relief port, and the side of the pressure relief valve body is provided with a pressure relief hole communicating with the pressure relief chamber and the outside environment; and wherein the pressure relief valve core is disposed in the pressure relief chamber and is moveable therein by the pressure relief spring.

6. The energy storage mechanism of claim 5, wherein the side wall of the pressure relief chamber is formed with a limiting and blocking surface that operably engages with the pressure relief valve core, such that when the pressure relief valve core is in tight contact with the limiting and blocking surface under the action of the pressure relief spring, the pressure relief valve is closed, and the air in the air chamber cannot be discharged; when air pressure in the air chamber increases and exceeds a preset threshold value, air from the air chamber enters into the pressure relief chamber through the pressure relief channel and the pressure relief port and pushes the pressure relief valve core away from the limiting and blocking surface to form a gap therebetween, the air then passes through the gap and is discharged from the pressure relief hole, thereby releasing the pressure inside the air chamber, and wherein when the air pressure in the air chamber drops to the preset threshold value, under the action of the pressure relief spring, the pressure relief valve core is pushed back to make it in tight contact with the limiting and blocking surface.

7. The energy storage mechanism of claim 1, further comprising:

a buffer pad disposed at the front end of the inner cylinder and configured to provide blocking and buffering for the striking mechanism, wherein the middle portion of the buffer pad is provided with a through hole through which the front end of the striker mechanism is extended.

8. The energy storage mechanism of claim 7, wherein the outer circumference of the buffer pad is provided with a mounting convex ring; the inner side of the front end of the outer cylinder body is provided with a limiting surface and a limiting boss; the front end of the buffer pad abuts against the limiting surface; and the front end surface of the inner cylinder abuts against the mounting convex ring and the limiting boss, thereby realizing the connections between the buffer pad, the inner cylinder and the outer cylinder body.

9. The energy storage mechanism of claim 7, wherein the interior of the inner cylinder is divided into a first cavity and a second cavity with variable volumes, the first cavity is in fluidic communication with the outside environment and the second cavity is in fluidic communication with the air chamber.

10. The energy storage mechanism of claim 7, wherein the inner cylinder body is provided with an inner through hole at one end close to the buffer pad for connecting the first cavity with the outside environment.

11. The energy storage mechanism of claim 10, further comprising a third sealing member disposed between the outer circumference of the front end of the inner cylinder and the inner wall of the outer cylinder body;

wherein the front end of the outer cylinder body is provided with an outer through hole aligned with and in fluidic communication with the inner through hole of the inner cylinder, thereby connecting the first cavity with the outside environment; and wherein the air chamber and the outer through hole are respectively located two sides of the third sealing member.

12. The energy storage mechanism of claim 11, further comprising:

a protruding ring arranged at the outer circumference of the inner cylinder distal to the third sealing member, and a circular positioning flange disposed on the outer circumference of the inner cylinder between the protruding ring and the rear cover of the outer cylinder, and having at least one air hole defined on the circular positioning flange for air passing through, wherein the inner circumference of the circular positioning flange is sleeved on the outer circumference of the inner cylinder, and the outer circumference of the circular positioning flange is blocked by the end surface of the rear cover facing the outer cylinder body, so that the circular positioning flange is limited between the rear cover and the protruding ring, wherein the third sealing member and the circular positioning flange are respectively disposed at the front and rear ends of the inner cylinder to support the front and rear ends of the inner cylinder.

13. The energy storage mechanism of claim 12, wherein the front end of the inner cylinder is fixed to the outer cylinder body, and the rear end of the inner cylinder is fixed to the outer cylinder body through the circular positioning flange.

14. The energy storage mechanism of claim 7, wherein the outer cylinder body further comprises a mounting portion formed at the front end of the outer cylinder body for mounting a transmission mechanism;

wherein the mounting portion includes a recess formed for mounting a transmission member that operably drives the striking mechanism to move in an opposite direction to the striking direction, and a mounting groove formed for accommodating the limiting member that operably limits the striking mechanism to move in the striking direction.

15. The energy storage mechanism of claim 14, wherein the recess has a hole on one side wall facing the groove for partially passing the limiting member.

16. A nail gun for nailing, comprising:

the energy storage mechanism of claim 1, wherein the energy storage mechanism is configured to provide energy to drive the striking mechanism to move in the striking direction, and store energy when the striking mechanism is driven to move in an opposite direction to the striking direction.

17. A nail gun, comprising:

a striking mechanism for striking nails out of the nail gun along a striking direction for nailing, wherein the striking mechanism comprises a plurality of tooth grooves;

an energy storage mechanism configured to provide energy to drive the striking mechanism to move in the striking direction, and store energy when the striking mechanism is driven to move in an opposite direction to the striking direction; and a transmission mechanism coupled with the energy storage mechanism and the striking mechanism for driving the striking mechanism to move in the opposite direction to the striking direction for storing energy, wherein the transmission mechanism comprises:

a rotating member configured to be driven by a driving motor to rotate, wherein the rotating member has a plurality of pin mounting holes, wherein the plurality of pin mounting holes comprises at least one movable pin mounting hole;

an engaging part arranged on the rotating member, wherein the engaging part comprises a plurality of engaging pins installed in the plurality of pin mounting holes, wherein the plurality of engaging pins comprises at least one movable engaging pin moveably installed in at least one movable pin mounting hole, and wherein two adjacent engaging pins define a gap therebetween; and an elastic assembly placed between the movable engaging pin and the rotating member, wherein the elastic assembly comprises a spring received in the at least one movable pin mounting hole with one end abutting against the movable engaging pin, and the other end abutting against the rotating member, wherein during the rotation of the rotating member, the plurality of engaging pins is sequentially meshed with the plurality of tooth grooves of the striking mechanism to achieve an engagement between the transmission member and the striking mechanism.

18. The nail gun of claim 17, wherein the energy storage mechanism comprises:

an energy storage member comprising an air chamber for containing air; an inner cylinder body for installing the striking mechanism therein; and an outer cylinder arranged outside the inner cylinder, such that the air chamber is formed between the outer cylinder and the inner cylinder;

an inflatable member disposed on the energy storage member and configured to inflate the air chamber; and a pressure relief member disposed on the energy storage member and configured to release the pressure in the air chamber.

19. The nail gun of claim 17, wherein the first engaging pin is the movable engaging pin.

* * * * *